July 25, 1967    M. L. CARPENTER    3,332,678
TORQUE SPRING FOR VEHICLE
Filed Aug. 9, 1965
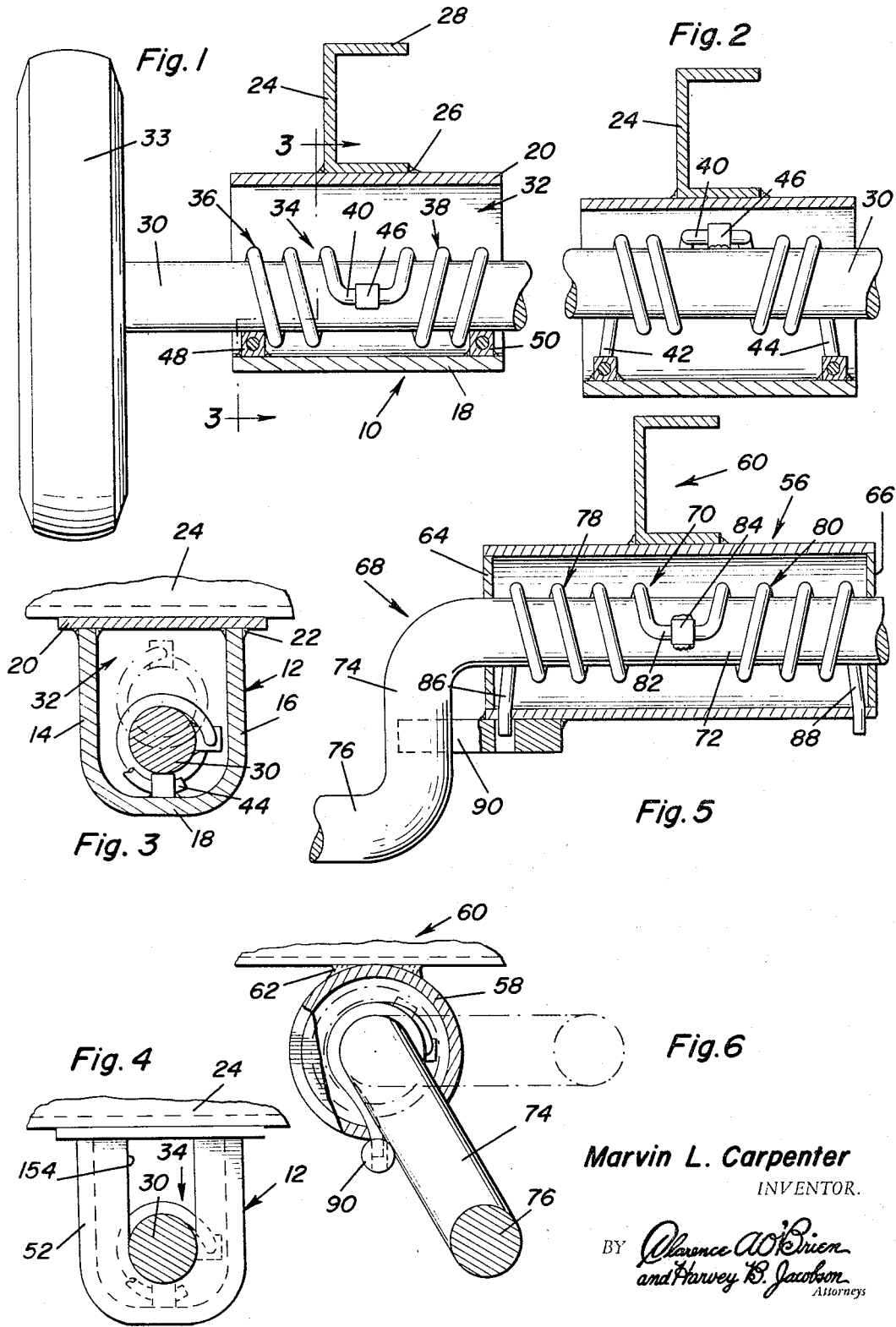
Marvin L. Carpenter
INVENTOR.
BY Clarence A. O'Brien
and Harvey B. Jacobson
Attorneys

United States Patent Office 3,332,678
Patented July 25, 1967

3,332,678
TORQUE SPRING FOR VEHICLE
Marvin L. Carpenter, 1616 E. 51st St.,
Odessa, Tex. 79760
Filed Aug. 9, 1965, Ser. No. 478,334
2 Claims. (Cl. 267—58)

ABSTRACT OF THE DISCLOSURE

A resilient suspension system for wheel mounting axles including a torsion spring having an intermediate portion wrapped about the axle with the ends thereof fixed to an axle receiving housing for a resilient resisting of rotation of the axle.

This invention relates to resilient wheel mountings for vehicles and more particularly to torque spring and hanger assemblies for wheeled vehicles.

In wheeled vehicles such as trailers or motorized vehicles it is desirable to provide resilient suspension for the axle of the vehicle instead of solid bearing mountings to lessen the transmission of road shock to the vehicle body. Of course, the suspension system such as used in automobiles is prohibitively expensive due to the complexity thereof, and hence it is desirable to provide a simpler, less expensive suspension system for carts or wagons and the like.

Accordingly, it is an object of the instant invention to provide a relatively inexpensive yet efficiently operating suspension system for wheeled vehicles.

It is a further object of the present invention to provide a hanger assembly and helical spring for use with the axle assemblies of wheeled vehicles.

It is a still further object of the present invention to provide a hanger assembly and torque spring for use with wheeled vehicles having straight axles.

It is another object of the present invention to provide a hanger assembly and torque spring for use with wheeled vehicles having knee action or offset axles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view partially in front elevation and partially in section illustrating a first preferred embodiment of axle assembly comprising the present invention;

FIGURE 2 is a sectional view similar to that of FIGURE 1 showing the axle of the axle assembly in a second position;

FIGURE 3 is a vertical sectional view taken substantially along the plane of the line 3—3 of FIGURE 1;

FIGURE 4 is a side elevational view of a modified embodiment of axle assembly as illustrated in FIGURES 1–3;

FIGURE 5 is a view partially in elevation and partially in section illustrating a second preferred embodiment of axle assembly comprising the present invention; and FIGURE 6 is a view partially in side elevation and partially in section illustrating the axle assembly of FIGURE 5.

Referring now to the drawings in greater detail and specifically to FIGURES 1–3, reference numeral 10 refers to a first embodiment of axle assembly of the present invention. In this embodiment of the invention, there is a substantially U-shaped housing member 12 having side walls 14 and 16 and bottom wall 18. The housing 12 also includes a top wall 20 to which the side walls 12 and 14 are welded as, for example, at 22. The housing 12 is adapted to be mounted to the bottom of a wheeled vehicle such as a wagon or cart by the mounting member 24, which member is fixedly attached to the top wall 20 of the housing 12 as for example by welds 26 and includes a top mounting plate 28 which will be attached to the bottom of the wagon or cart by conventional attaching means such as screws or bolts or the like.

The wagon or cart with which the present form of the invention is to be used will have a solid axle 30, which normally will extend transversely of the wagon or cart and have rotatably mounted at each end thereof, by conventional mounting means, a pair of wheels 33. The wheels 33 and the mounting thereof may be of any desired variety, and form no part of the present invention.

The solid axle 30 is normally cylindrical in cross-section, as shown in FIGURE 3, and extends through the chamber 32 formed by the housing 12. Of course, it will be appreciated that any particular wagon or cart utilizing the present invention will use two axle mounting housings 12, one at each end of the axle 30 and mounted adjacent the side of the wagon.

Contained within the chamber 32 is a spring member generally designated at 34. This spring member 34 is preferably a heavy duty helical spring of steel or similar material, having a first helical section 36, a second helical section 38 and a transverse or cross member 40. The cross member 40 joins the adjacent ends of the helical sections 36 and 38 and is a straight spring portion which extends substantially parallel to the axis of axle 30. The helical portions 36 and 38 of spring 34 terminate in end portions 42 and 44, respectively. The intermediate portion 40 is fixedly attached to the axle 30 by means of mounting block 46, which is a generally cubical block having a hole extending therethrough parallel to the axis of axle 30 through which intermediate spring portion 40 extends. The block 46 is fixedly mounted on the axle 30 as, for example, by being welded thereon. A pair of mounting blocks 48 and 50 similar to block 46 are fixedly mounted to the bottom wall 18 of housing 12 as, for example, by being welded thereon. The ends 42 and 44 of the helical spring portions 36 and 38 are fixedly mounted in the blocks 48 and 50 and in this manner the spring 34 is effectively fixedly mounted at its ends to the bottom of the housing and at its central or intermediate portion to the axle. Thus, by viewing FIGURES 1–3, it may be observed when upwardly directed force is exerted on the axle 30, as for example, when the wheel 33 hits a projection in the road surface, the axle 30 will be moved upwardly in chamber 32. During this upward movement of axle 30, the axle will be rotated counter-clockwise as shown by the ghost lines in FIGURE 3, thereby unrolling the spring portions 36 and 38. The spring portions 36 and 38, of course, exert a resilient resistance to this upward movement of axle 30 thereby effectively providing a resilient suspension system for the wagon or cart. Of course, when the upward force against axle 30 is relieved, the resiliency of the spring 34 will cause the spring to rewind, and due to the rigid connection of intermediate portion 40 to the axle, the axle 30 will be moved downwardly to its initial position shown in FIGURE 1.

In will be appreciated that the embodiment of the invention illustrated in FIGURES 1 through 3 allows the axle 30 to move both upwardly or vertically and somewhat laterally in the housing. However, in order to prevent any lateral movement, a modified embodiment of the invention is illustrated in FIGURE 4.

As will be appreciated, FIGURE 4 is a view of the housing 12 taken so as to show axle 30 in cross-section. The housing 12, axle 30 and spring 34 are identical to the similarly numbered elements illustrated in FIGURES 1–3. However, a pair of end plates 52 are mounted over the opposite open ends of the housing 12, the plates 52 each including vertically directed slots 54 therein. The bottom of the slots 54 corresponds to the bottom position of axle 30, as illustrated in FIGURE 1. The slot 54 will be sufficiently wide to allow axle 30 to move upwardly in the housing 12 during the upward rotational movement caused by spring 34 when force is directed upwardly against axle 30, but also sufficiently narrow to eliminate lateral movement of the axle 34 in the housing 12. The end plates 52 may be mounted on the open ends of the housing and against the top wall as for example by being welded thereon.

Referring now to FIGURES 5 and 6 for a description of a modified embodiment of the invention, numeral 56 refers to the housing used with this form of the invention. The housing 56 is a substantially hollow cylindrical member 58 and has mounted to the upper portion thereof a mounting member 60 substantially similar to mounting member 24 described above. The mounting member 60 is fastened to the housing 58, as, for example, by welding 62. The housing 56 includes a pair of end walls 64 and 66 closing the open ends of a cylindrical member 58, and having centrally oriented holes therein which are generally concentric. These holes receive the vehicle axle, generally designated by numeral 68. Further, the end walls 64 and 66 prevent the spring, generally designated by numeral 70 from shifting laterally in the housing.

The axle 68 includes a straight portion 72 which extends through the aforementioned holes in end walls 64 and 66 and as will be appreciated extends to the other side of the wagon or cart wherein another housing identical to housing 56 is mounted. The axle 68 also includes an offset or crank portion 74 which is integrally formed with straight portion 72 and by virtue of the right angle bend therebetween, extends perpendicularly to portion 72. The axle 68 includes a third wheel bearing portion 76 which is integrally formed with offset portion 74 and by virtue of the right angle bend therebetween extends perpendicularly to offset portion 74 and parallel to straight portion 72. It will be appreciated, of course, that a wheel such as wheel 33 will be mounted on the end of wheel bearing portion 76.

A spring 70, substantially similar to the spring 34 described in relation to FIGURES 1–4 above, and including first and second helical portions 78 and 80 and an intermediate portion 82 is provided. The intermediate portion is fastened to the axle by mounting block 84. The mounting block 84 is substantially similar to mounting block 46 described above. The spring 70 further includes end portions 86 and 88 which are fixedly mounted to the bottom of the cylindrical housing 56. The end portion 88 extends through a hole in the bottom of the cylindrical housing 56 and is fixed to the housing 56 by being welded or force fit in the hole. The end portion 86 extends through a similar hole in the bottom of cylindrical housing 56 and also in a hole in the brake stop 90 to be described below. Thus, by viewing FIGURE 6, it will be observed that the axle 68 will be moved from a first rest position shown in full lines to a second position as shown by the lines in ghost whenever the wheel mounted on wheel bearing portion 76 hits a projection or the like in the road surface, the spring 70 being expanded as shown by the lines in ghost. Of course, the spring 70 will exert resilient resistance to counterclockwise movement of the axle 68 (when viewing FIGURE 6), and thereby will provide a resilient suspension system for the wagon or cart. It is apparent, of course, that when the upward force on the wheel bearing portion 76 of axle 68 is terminated, the compressive force of spring 70 will cause the axle to rotate back to its rest position.

The brake stop 90 is provided to establish a rest or initial position for the axle 68, thereby insuring that the initial position is angularly offset from the vertical so that upwardly directed force against wheel bearing portion 76 will cause the axle to rotate. If the offset portion 74 of the axle was in a vertical position with respect to the force transmitted against wheel bearing portion 76, the axle 68 would not rotate and hence the device would be inoperative as a resilient suspension system for the vehicle. The brake stop 90 is a substantially cylindrical member which is fixedly mounted on the bottom of the housing 56 as for example by being welded thereto, and extends outwardly of the end wall 68 for engagement with the offset portion 74 of the axle 68. The spring 70 will maintain the offset portion of the axle against the brake stop until such time as force is directed upwardly against the wheel bearing portion 76, at which time the axle will rotate upwardly and the spring 70 will expand. It will be noted, however, that if the spring 70 is set so that the rest position of axle 68 would normally be angularly offset from the vertical in the direction shown in FIGURE 6, a brake stop such as that described above will not be required for the device to be operative.

It will further be appreciated that the initial or rest position of the spring 70 could be in the expanded position shown by ghost lines in FIGURE 6. In this case, the axle 68 could rotate either clockwise or counter-clockwise if the brake stop is eliminated. Also, the position of the spring could be reversed by turning it ninety degrees when in such expanded condition, and thus the spring would be tightened by rotation of axle 68 rather expanded as contemplated by the present position of the spring.

In summary of the above invention, a torsion spring in the form of a double helical spring joined by a straight or intermediate portion is wrapped about the axle the ends of the spring being fixed to a housing member and the intermediate portion of the spring being fixed to the axle whereby a resilient suspension system may be provided for use with wagons or carts or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an axle assembly for supporting a wheeled vehicle body, a hanger housing adapted for mounting on the bottom of the vehicle body, said housing defining a chamber, resilient spring means within said chamber, said spring means having first and second coiled portions and an intermediate portion joining said coiled portions, the ends of said first and second coiled portions being fixedly attached to said housing, an axle extending through said chamber, means for fixedly connecting said intermediate portion to said axle, said spring means being mounted to be unwound when said axle is rotated thereby resiliently resisting such rotation of said axle, said housing comprising an elongated cylindrical member having open ends, a pair of plate means closing said open ends, said plate means having holes substantially in the center thereof, said axle having a straight portion extending through said holes in said plate means, an offset portion integrally formed with said straight portion and extending perpendicularly to said straight portion, and a wheel bearing portion formed integrally with said offset portion and extending substantially parallel to said straight portion, said cylindrical member including openings in the wall thereof, the ends of said coiled portions being fixedly mounted in said openings.

2. The apparatus of claim 1 wherein said connecting means comprises a substantially U-shaped member mounted on the straight portion of said axle, said intermediate portion of said spring means extending through said substantially U-shaped member.

References Cited

UNITED STATES PATENTS

| | | | |
|---|---|---|---|
| 2,068,676 | 1/1937 | Hickman | 267—58 |
| 2,558,311 | 6/1951 | Morrow | 267—58 |
| 2,609,212 | 9/1952 | McMurtrie | 280—124 X |
| 2,957,707 | 10/1960 | Zagwyn | 267—58 X |

FOREIGN PATENTS 675,035   5/1939   Germany.

BENJAMIN HERSH, *Primary Examiner.*

RICHARD J. JOHNSON, *Examiner.*